United States Patent
Seol

(10) Patent No.: US 11,173,833 B2
(45) Date of Patent: Nov. 16, 2021

(54) VEHICLE AND METHOD FOR CONTROLLING THE SAME

(71) Applicants: Hyundai Motor Company, Seoul (KR); Kia Motors Corporation, Seoul (KR)

(72) Inventor: Unhwan Seol, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 225 days.

(21) Appl. No.: 16/540,607

(22) Filed: Aug. 14, 2019

(65) Prior Publication Data

US 2020/0172009 A1 Jun. 4, 2020

(30) Foreign Application Priority Data

Dec. 4, 2018 (KR) .................. 10-2018-0154510

(51) Int. Cl.
*B60Q 3/80* (2017.01)
*B60Q 3/74* (2017.01)

(52) U.S. Cl.
CPC .............. *B60Q 3/80* (2017.02); *B60Q 3/74* (2017.02); *B60Q 2900/30* (2013.01)

(58) Field of Classification Search
CPC ........... B60Q 1/1407; B60Q 2300/054; B60Q 2300/305; B60Q 2300/31; B60Q 3/18; B60Q 3/74; B60Q 3/80; B60Q 2900/30; B64D 11/00; B64D 2011/0053; G06K 9/00845; G09G 2320/0666; G09G 2354/00; G09G 2360/144; G09G 2380/10; G09G 2380/14; G09G 3/3413; H05B 45/20; H05B 47/11; Y02B 20/40
See application file for complete search history.

(56) References Cited

U.S. PATENT DOCUMENTS

| | | | | |
|---|---|---|---|---|
| 2015/0291032 A1* | 10/2015 | Kim | ................ | G06F 3/0488 701/36 |
| 2016/0159276 A1* | 6/2016 | Thomas | ................ | B64D 11/00 315/77 |
| 2017/0185271 A1* | 6/2017 | Manoharan | ......... | G06F 3/04845 |
| 2017/0217367 A1* | 8/2017 | Pflug | ................ | H05B 47/11 |

FOREIGN PATENT DOCUMENTS

KR 10-2018-0062036 A 6/2018

* cited by examiner

*Primary Examiner* — Renan Luque
(74) *Attorney, Agent, or Firm* — Morgan, Lewis & Bockius LLP

(57) ABSTRACT

A vehicle includes: a lighting device disposed in the vehicle interior; a communicator configured to communicate with an external server; a user interface configured to receive a destination from a user; and a controller configured to obtain a reference characteristic value of the destination from the external server, and to control the lighting device based on a lighting adjustment value determined from the reference characteristic value.

18 Claims, 5 Drawing Sheets

FIG.4

| DESTINATION | CATEGORY | REFERENCE CHARACTERISTIC VALUE (COLOR TEMPERATURE) | | |
|---|---|---|---|---|
| AA RESTAURANT<br>BB RESTAURANT<br>CC RESTAURANT<br>... | INDOOR/ RESTAURANT | 3,500K<br>(INDOOR DOES NOT REFLECT WEATHER INFORMATION) | | |
| DD AMUSEMENT PARK<br>EE WATER PARK<br>FF HANGANG PARK<br>... | WEATHER INFORMATION OF DESTINATION | CLEAR | CLOUDY | RAIN |
| | OUTDOOR/PARK | 6,000K | 4,500K | 3,500K |
| GG OFFICE<br>HH HOUSE<br>II GENERAL BUILDING<br>... | INDOOR/ GENERAL BUILDING | 4,000K | | |
| JJ WEDDING HALL<br>KK PERFORMANCE HALL<br>LL EXHIBITION HALL<br>... | INDOOR/ PERFORMANCE HALL | 3,000K | | |

FIG.5

| DIVISION | TIME | TIME WEIGHT |
|---|---|---|
| NIGHT | SUNRISE ~ SUNSET | 0.1 |
| SUNRISE | SUNSET ~ 08:00 | 0.3 |
| MORNING | 08:00 ~ 11:00 | 0.7 |
| NOON | 11:00 ~ 15:00 | 1 |
| AFTERNOON | 15:00 ~ 17:00 | 0.6 |
| SUNSET | 17:00 ~ SUNRISE | 0.3 |

VEHICLE AND METHOD FOR CONTROLLING THE SAME

CROSS-REFERENCE TO RELATED APPLICATION(S)

This application is based on and claims the benefit of priority to Korean Patent Application No. 10-2018-0154510, filed on Dec. 4, 2018 in the Korean Intellectual Property Office, the entire disclosure of which is incorporated by reference herein.

TECHNICAL FIELD

Embodiments of the disclosure relate to a vehicle capable of controlling lighting of a vehicle interior similar to an environment of a destination, and a method of controlling the vehicle.

BACKGROUND

A vehicle interior is equipped with various lighting devices. For example, a room lamp, which is located on a ceiling of the vehicle interior to light the vehicle interior as a whole, and a mood lamp for changing the atmosphere of the vehicle interior, may be provided inside a vehicle.

There are also various techniques for controlling the lighting of the vehicle interior. Some lighting systems may control brightness of interior lighting according to a current position and a current time of the vehicle.

SUMMARY

According to one aspect of the present disclosure, a vehicle may be capable of controlling an interior lighting condition of the vehicle according to environment information of a destination rather than a current position of the vehicle, and a method of controlling such a vehicle is also disclosed.

Additional aspects of the disclosure will be set forth in part in the description which follows and, in part, will be obvious from the description, or may be learned by practice of the disclosure.

In accordance with an aspect of the disclosure, a vehicle may include: a lighting device disposed in an interior of the vehicle; a communicator configured to communicate with an external server; a user interface configured to receive a destination from a user; and a controller configured to obtain a reference characteristic value of the destination from the external server, and to control the lighting device based on a lighting adjustment value determined from the reference characteristic value.

The controller may determine an image characteristic value from an image of the destination obtained from the external server, and may determine the lighting adjustment value by applying a weight to the reference characteristic value and the image characteristic value.

The controller may determine a weighted average value by applying a first weight to the reference characteristic value and the image characteristic value, and may determine the lighting adjustment value by applying a second weight to the weighted average value.

The controller may determine an estimated arrival time of the destination, and apply the second weight corresponding to the estimated arrival time.

The controller may obtain, when the destination is an outdoor place, the reference characteristic value in which weather information of the destination is reflected.

The controller may obtain a plurality of images of the destination, and may determine the image characteristic value by averaging respective characteristic values of the plurality of images.

The controller may obtain a predetermined threshold number or more of the images when obtaining the plurality of images.

The controller may determine the lighting adjustment value for at least one of brightness of light or color of light emitted by the lighting device.

The lighting device may include a plurality of lighting devices. The controller may independently control each of the plurality of lighting devices based on the reference characteristic value and the image characteristic value.

The vehicle may further include: a storage configured to store reference characteristic values for a plurality of places. The controller may obtain the reference characteristic value of the destination from the storage or the external server.

In accordance with another aspect of the disclosure, a method of controlling a vehicle may include: receiving a destination from a user through a user interface; obtaining, by a controller, a reference characteristic value of the destination from an external server; and controlling, by the controller, a lighting device disposed in an interior of the vehicle based on a lighting adjustment value determined from the reference characteristic value.

The method may further include: obtaining, by the controller, an image of the destination from the external server, and determining an image characteristic value from the image of the destination. The controlling of a lighting device may include determining the lighting adjustment value by applying a weight to the reference characteristic value and the image characteristic value.

The determining the lighting adjustment value may include determining a weighted average value by applying a first weight to the reference characteristic value and the image characteristic value; and determining the lighting adjustment value by applying a second weight to the weighted average value.

The determining the light adjustment value by applying of a second weight may include determining an estimated arrival time of the destination, and applying the second weight corresponding to the estimated arrival time.

The obtaining a reference characteristic value of the destination may include obtaining, when the destination is an outdoor place, the reference characteristic value in which weather information of the destination is reflected.

The determining an image characteristic value may include obtaining a plurality of the images of the destination; and determining the image characteristic value by averaging respective characteristic values of the plurality of images.

The obtaining a plurality of images of the destination may include obtaining a predetermined threshold number or more of the images.

The determining the lighting adjustment value may include determining the lighting adjustment value for at least one of brightness of light or color of light emitted by the lighting device.

The lighting device may include a plurality of lighting devices. The controlling a lighting device may include independently controlling each of the plurality of lighting devices based on the reference characteristic value and the image characteristic value.

The obtaining a reference characteristic value of the destination may include obtaining the reference characteristic value of the destination from a storage configured to store reference characteristic values for a plurality of places or from the external server.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 4 is a view for describing reference characteristic values of a destination; and FIG. 5 is a view for describing a weight applied when determining a lighting adjustment value.

DETAILED DESCRIPTION

Figure 1:
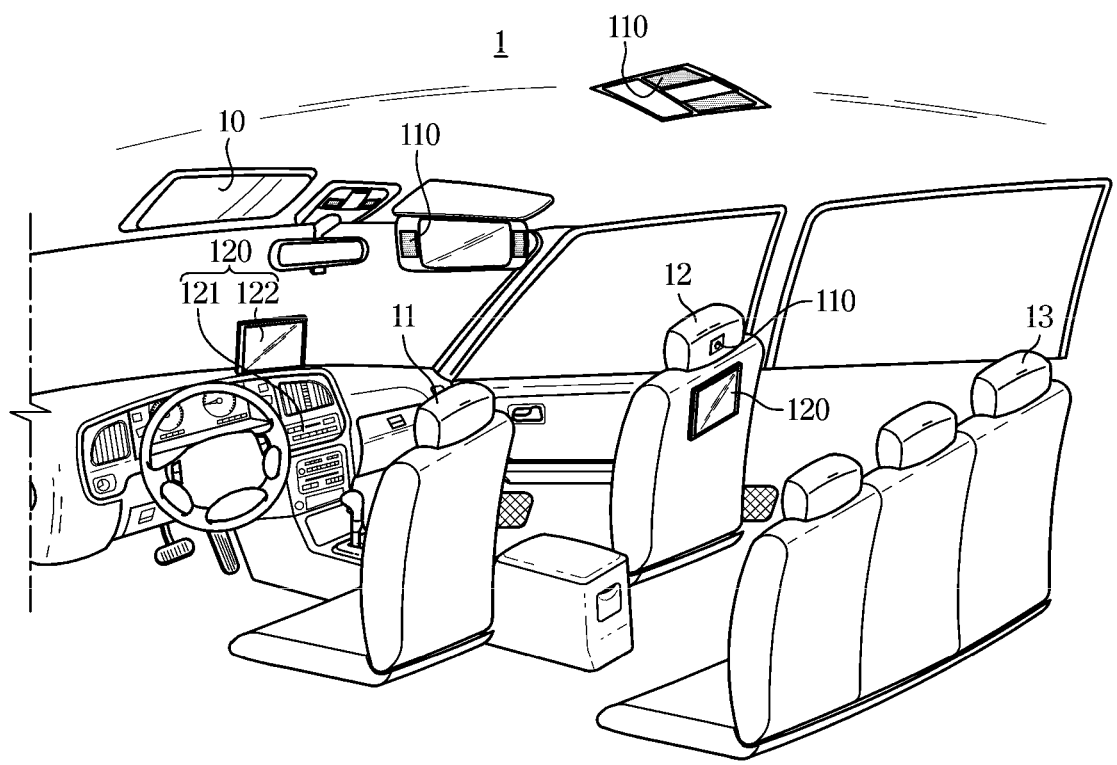
FIG. 1 is a view illustrating an interior of a vehicle according to exemplary embodiments of the present disclosure.

Like reference numerals refer to like elements throughout the specification. Not all elements of embodiments of the disclosure will be described, and description of what are commonly known in the art or what overlap each other in the embodiments will be omitted.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

As used herein, the singular forms "a," "an" and "the" are intended to include the plural forms as well, unless the context clearly indicates otherwise.

As used herein, the terms "portion," "unit," "block," "member," and "module" refer to a unit that can perform at least one function or operation. For example, these terms may refer to at least one process which is performed by at least one piece of hardware such as a field-programmable gate array (FPGA) and an application specific integrated circuit (ASIC), and at least one piece of software stored in a memory or a processor.

An identification code is used for the convenience of the description but is not intended to illustrate the order of each step. Each of the steps may be implemented in an order different from the illustrated order unless the context clearly indicates otherwise.

Hereinafter, embodiments of a vehicle and a method of controlling the vehicle according to an aspect will be described in detail with reference to the accompanying drawings.

Figure 2:
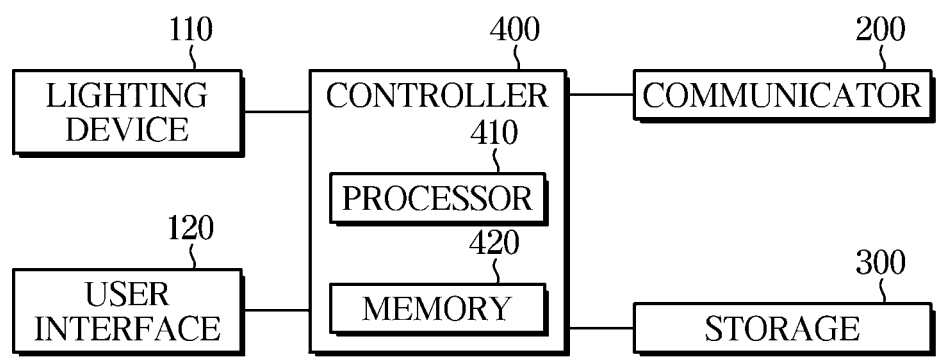
FIG. 2 is a control block diagram of a vehicle according to exemplary embodiments of the present disclosure.

FIG. 1 is a view illustrating an interior of a vehicle according to embodiments of the disclosure, and FIG. 2 is a control block diagram of a vehicle according to embodiments of the disclosure.

Referring to FIG. 1, a vehicle 1 may include a plurality of seats. For example, the vehicle 1 may include a driver's seat 11, a passenger seat 12, and a rear seat 13. The number of seats of the vehicle 1 may be changed depending on the size of the vehicle 1.

The vehicle 1 may include a lighting device 110 that is provided in a vehicle interior. The lighting device 110 may be installed at various positions inside the vehicle 1. For example, the lighting device 110 may be installed on a ceiling of the vehicle interior, an interior sun visor 10, headrests of the driver's seat 11 and the passenger seat 12, and doors of the vehicle 1. Further, the lighting device 110 may be installed at a position such as a dashboard, a windshield, or the seats, and there is no limitation on the installation position and the number.

The lighting device 110 may include a light source such as a lamp or a Luminescent Emitted Diode (LED) module. In addition, the lighting device 110 may include the light source that emits light of various colors such as red (R), green (G), blue (B), and white (W).

For example, a room lamp is generally located on the ceiling of the vehicle interior and emits white light to illuminate the interior of the vehicle as a whole. A lamp installed in the interior sun visor 10 may illuminate passengers according to an angle of the sun visor. Further, a mood lamp (not shown) is installed on the doors of the vehicle 1 and may emit light of various colors, thereby changing the atmosphere of the vehicle interior.

In addition, the vehicle 1 may include a user interface 120. The user interface 120 is an input/output device for performing audio functions, video functions, navigation functions, and various functions of the vehicle 1. The user interface 120 may include an inputter 121 for receiving an operation command of various functions and may include an outputter 122 for outputting information about a function being executed and information input by a user. The user interface 120 may be an AVN device. The user interface 120 may be installed at various positions such as the dashboard, a center fascia, and a head unit.

The inputter 121 may be provided on the center fascia installed at the center of the dashboard, or may be implemented using a physical button, a knob, a touch pad, a touch screen, a stick type operation device, or a trackball. The inputter 121 is not limited to the above example. Also, what may be included in the inputter 121 without limitation as long as it can receive a user's input.

The outputter 122 may include a display. The display may be implemented with various panels. The display panel may be a light emitting diode (LED) panel, an organic light emitting diode (OLED) panel, a liquid crystal display (LCD) panel, or a touch panel.

When the user interface 120 includes the touch panel, both the functions of the inputter 121 and the outputter 122 may be performed by the touch panel. In addition, the user interface 120 may include a speaker for outputting an audio signal.

The user may input a destination using the user interface 120. When the destination is input by the user, the user interface 120 may output information about the destination under the control of a controller 400. For example, the user interface 120 may output a current position, a driving path to the destination, an estimated arrival time of the destination, an image of the destination, weather information of the destination, and the like on the display.

Referring to FIG. 2, the vehicle 1 may include the lighting device 110, the user interface 120, a communicator 200, a storage 300, and the controller 400.

The lighting device 110 may be installed at various positions in the vehicle 1 to emit light, as described above.

The lighting device 110 may include an on/off button and may include buttons for controlling brightness or color. The user may also input a command to control at least one of the brightness or color of the lighting device 110 through the user interface 120.

The communicator 200 may communicate with an external server (not shown) to transmit and receive data. Particularly, the communicator 200 may receive at least one of reference characteristic values of the destination, the image of the destination, and the weather information of the destination from the external server under the control of the controller 400.

The external server may include various servers for collecting, processing, and providing information such as a web server, a telematics server, and the like.

The communicator 200 may be a hardware device implemented by various electronic circuits, e.g., a processor, to transmit and receive signals via wireless or wired connections. The communicator 200 may communicate with the external server using various methods. The communicator 200 may transmit and receive data to/from the external server by using various communication technologies, such as vehicle-to-vehicle (V2V) communication, wireless fidelity (Wi-Fi), wireless local area network (WLAN), Ultra-Mobile Broadband (UMB), Global Positioning System (GPS), Long-Term Evolution (LTE), etc. The communicator 200 is not limited thereto, and may be applied to any method that can communicate with the external server.

The storage 300 may store the reference characteristic values for a plurality of places. In addition, the storage 300 may store the image of the destination obtained from the external server.

The controller 400 may include at least one or more processors 410 (e.g., computer, microprocessor, CPU, ASIC, circuitry, logic circuits etc.) and a memory 420. The memory 420 may store, e.g., software instructions reproducing control algorithms, a program(s), etc., which, when executed by the processor 410, controls operations of various devices of the vehicle 1, and the processor 410 may transmit a control signal for controlling the devices of the vehicle 1 according to the control algorithms. The processor 410 and the memory 420 included in the controller 400 may be implemented as a single integrated semiconductor circuit or may be physically separated.

The storage 300 and the memory 420 may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or a storage medium (for example, Hard Disk Drive (HDD) and Compact Disc Read Only Memory (CD-ROM)), although not limited to these.

Hereinafter, the operation in which the controller 400 controls the lighting device 110 will be described in detail with reference to FIGS. 3 to 5.

Figure 3:
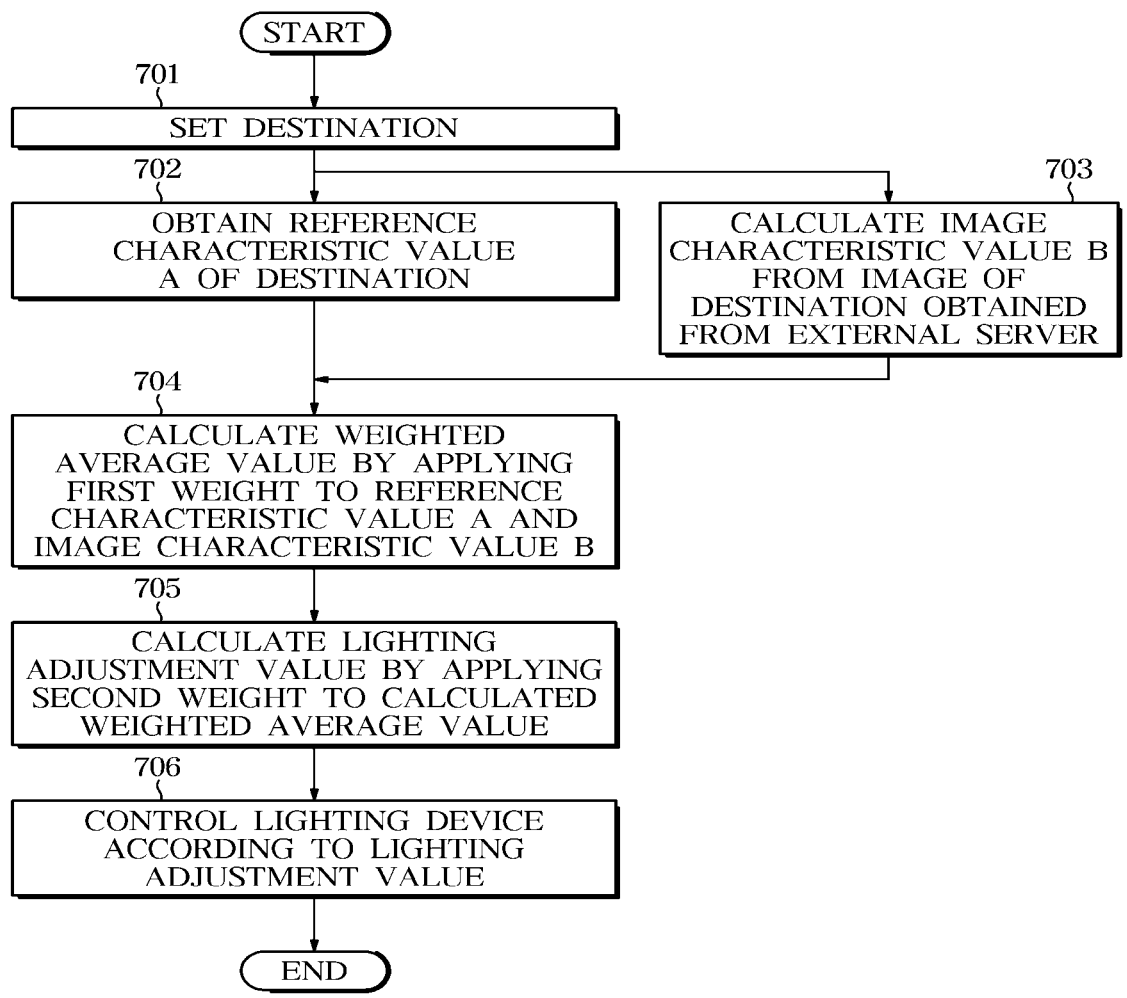
FIG. 3 is a flowchart for describing a method of controlling a vehicle according to exemplary embodiments of the disclosure.

FIG. 3 is a flowchart for describing a method of controlling a vehicle according to embodiments of the disclosure, FIG. 4 is a view for describing reference characteristic values of a destination, and FIG. 5 is a view for describing a weight applied when determining a lighting adjustment value.

Referring to FIG. 3, the destination is set through the user interface 120 (701). When the destination is set, the controller 400 may obtain a reference characteristic value A of the destination from the storage 300 or the external server (702).

According to one aspect of the present disclosure, the reference characteristic value A of the destination may refer to a color temperature of the destination. The color temperature may be, for example, a numerical value of the color of the light source using an absolute temperature. The color temperature is lower for a dark light source of a red color system, and higher for a bright light source of a blue color system. The color temperature is Kelvin (K), which is an absolute temperature unit. The color temperature is related to Planck's law and Wien's displacement law. A Correlated Color Temperature, which is an approximation on the CIE color chart, is used because blackbody radiation is not achieved in actual lighting.

The reference characteristic value A of the destination may be changed depending on the type or category of the destination. For example, when the destination is an underground parking lot, since the underground parking lot generally has a dark lighting condition, the reference characteristic value A of the destination may be determined to be a low color temperature value. In addition, when the destination is an outdoor place under clear weather, since the outdoor place under the clear weather has a bright lighting condition, the reference characteristic value A of the destination may be determined to be a high color temperature value.

Referring to FIG. 4, the reference characteristic value A of the destination may be a predetermined value corresponding to the category of the destination. Further, the reference characteristic value A of the destination may be extracted from a category database of the destination. The category database of the destination may be determined by determining the reference characteristic value A for a number of places. In other words, the category database of the destination may include data on the category to which a specific destination belongs and the reference characteristic value A of the category. The category database of the destination may be pre-stored in the storage 300 or may be obtained from the external server.

For example, when the destination is a place such as an AA restaurant, a BB restaurant, a CC restaurant, etc., the category of the destination may be classified as an indoor restaurant. The color temperature of the indoor restaurant may be 3500K, and thus the reference characteristic value A of the AA restaurant, the BB restaurant, the CC restaurant, etc. may be determined to be 3500K.

In another example, when the destination is an outdoor place such as a DD amusement park, an EE water park, an FF Hangang Park, etc., the category of the destination may be classified as an outdoor park. The color temperature of the outdoor park may be changed according to the weather conditions. The color temperature in the case of clear weather may be 6000K, the color temperature in the case of cloudy weather may be 4500K, and the color temperature in case of rainy weather may be 3500K.

In other words, when the destination inputted by the user is the outdoor place, the reference characteristic value A of the destination may be determined by reflecting the weather information. When the destination is the outdoor place, the controller 400 may obtain the weather information of the destination from the external server.

Furthermore, in still another example, when the destination is the indoor place such as a GG office, an HH house, etc., the reference characteristic value A may be determined to be 4000K. When the destination is an indoor performance site such as a JJ wedding hall, a KK performance hall, an LL exhibition hall, etc., the reference characteristic value A may be determined to be 3000K. Since the category of the destination and the reference characteristic values illustrated in FIG. 4 are only exemplary, the category of the destination and the reference characteristic values are not limited to those illustrated in FIG. 4.

The controller 400 may control the lighting device 110 based on a lighting adjustment value determined from the reference characteristic value of the destination.

Referring again to FIG. 3, the controller 400 may obtain the image of the destination from the external server and determine an image characteristic value B from the image of the destination (703). The controller 400 may obtain a predetermined threshold number or more of images from the external server. The obtaining the predetermined threshold number or more of the images may be intended to increase the accuracy of the image characteristic value B. That is, the controller 400 may determine the image characteristic value B by analyzing a plurality of the images, determining the characteristic values from the respective images, and averaging the characteristic values.

The image characteristic value B may refer to the color temperature of the obtained image. There may be the plurality of images for the same destination, and each of the images may be captured in a different lighting environment. Thus, the color temperature of each of the plurality of images may not be the same. The controller 400 may determine a color temperature average value from the plurality of images of the destination.

On the other hand, since the reference characteristic value A of the destination is obtained from a pre-stored database, it may be different from the reference characteristic value A (color temperature) of an actual destination. Therefore, it is necessary to determine the image characteristic value B from the image of the destination to compensate the reference characteristic value A.

The controller 400 may determine a lighting adjustment value D by applying a weight to the reference characteristic value A and the image characteristic value B. The controller 400 may determine an adjustment value for at least one of the brightness of light emitted by the lighting device 110 and the color of the light.

Particularly, the controller 400 may determine a weighted average value by applying a first weight w1 to the reference characteristic value A and the image characteristic value B (704). The weighted average value of the reference characteristic value A and the image characteristic value B may be determined by the following Equation 1.

$$\text{weighted average value}(C) = (A*w1 + B*(1-w1))/2 \quad \text{[Equation 1]}$$

Here, A is the reference characteristic value, B is the image characteristic value, and w1 is the first weight.

In addition, the controller 400 may determine the lighting adjustment value D by applying a second weight w2 to the determined weighted average value (705).

Referring to FIG. 5, the controller 400 may determine the estimated arrival time of the destination and apply the second weight w2 corresponding to the estimated arrival time to the weighted average value. The second weight w2 may be determined as a time weight corresponding to the estimated arrival time of the destination. For example, when the estimated arrival time of the destination is determined at 21:00 (night), the second weight w2 may be determined to be 0.1. Since the time weight illustrated in FIG. 5 is only an example, the second weight w2 is not limited to that illustrated in FIG. 5.

When the current time the user inputs for the destination is 16:00 and the estimated arrival time of the destination is determined as 21:00 (night), the environment of the destination at 16:00 and the environment of the destination at 21:00 may differ from each other. For example, when the destination is the FF Hangang Park, the FF Hangang Park may be a bright environment at 16:00 and a dark environment at 21:00. Therefore, it is necessary to compensate the color temperature of the destination which changes according to the estimated arrival time of the destination.

The lighting adjustment value D to which the second weight w2 is applied may be determined by the following Equation 2.

$$\text{lighting adjustment value}(D) = \text{weighted average value}(C) + \text{second weight}(w2) \quad \text{[Equation 2]}$$

Finally, the controller 400 may control the lighting device 110 based on the determined lighting adjustment value D (706). The controller 400 may control at least one of the brightness of light and the color of light emitted by the lighting device 110 because the lighting adjustment value D includes the adjustment value for at least one of the brightness of light and the color of light emitted by the lighting device 110.

When there are a plurality of the lighting devices 110 installed in the interior of the vehicle 1, the controller 400 may determine the lighting adjustment values for each of the plurality of lighting devices 110 to control each of the plurality of lighting devices 110 independently.

On the other hand, in conventional systems, since lighting of an interior of a vehicle may be controlled according to the surrounding conditions of the vehicle at the current position and the current time of the vehicle, the passengers cannot detect the environment conditions of the destination (in particular, the lighting conditions of the destination).

According to exemplary embodiments of a vehicle and a method of controlling the vehicle as described above, it is possible to control the interior lighting condition of the vehicle according to the environment information of the destination rather than the current position of the vehicle.

As a result, when the passengers, for example, coordinate their attires or make-ups in the vehicle while moving to the destination, the coordination of the attires or make-ups suitable for the environment of the destination is possible.

Meanwhile, the disclosed embodiments may be implemented in the form of a recording medium storing instructions that are executable by, e.g., a computer, etc. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A vehicle comprising:
a lighting device disposed in an interior of the vehicle;
a communicator configured to communicate with an external server;
a user interface configured to receive a destination from a user; and
a controller configured to obtain a reference characteristic value of the destination from the external server, and to control the lighting device based on a lighting adjustment value determined from the reference characteristic value,
wherein the controller is configured to determine an image characteristic value from an image of the destination obtained from the external server, and to determine the lighting adjustment value by applying a weight to the reference characteristic value and the image characteristic value.

2. The vehicle according to claim 1, wherein the controller is configured to determine a weighted average value by applying a first weight to the reference characteristic value and the image characteristic value, and to determine the lighting adjustment value by applying a second weight to the weighted average value.

3. The vehicle according to claim 2, wherein the controller is configured to determine an estimated arrival time of the destination, and to apply the second weight corresponding to the estimated arrival time.

4. The vehicle according to claim 1, wherein the controller is configured to obtain, when the destination is an outdoor place, the reference characteristic value in which weather information of the destination is reflected.

5. The vehicle according to claim 1, wherein the controller is configured to obtain a plurality of images of the destination, and to determine the image characteristic value by averaging respective characteristic values of the plurality of images.

6. The vehicle according to claim 5, wherein the controller is configured to obtain a predetermined threshold number or more of the images when obtaining the plurality of images.

7. The vehicle according to claim 1, wherein the controller is configured to determine the lighting adjustment value for at least one of brightness of light or color of light emitted by the lighting device.

8. The vehicle according to claim 1, wherein the lighting device includes a plurality of lighting devices, and
wherein the controller is configured to independently control each of the plurality of lighting devices based on the reference characteristic value and the image characteristic value.

9. The vehicle according to claim 1, further comprising:
a storage configured to store reference characteristic values for a plurality of places,
wherein the controller is configured to obtain the reference characteristic value of the destination from the storage or the external server.

10. A method of controlling a vehicle comprising:
receiving a destination from a user through a user interface;
obtaining, by a controller, a reference characteristic value of the destination from an external server;
obtaining, by the controller, an image of the destination from the external server, and determining an image characteristic value from the image of the destination; and
controlling, by the controller, a lighting device disposed in an interior of the vehicle based on a lighting adjustment value determined from the reference characteristic value,
wherein the controlling a lighting device comprises:
determining the lighting adjustment value by applying a weight to the reference characteristic value and the image characteristic value.

11. The method according to claim 10, wherein the determining the lighting adjustment value comprises:
determining a weighted average value by applying a first weight to the reference characteristic value and the image characteristic value; and
determining the lighting adjustment value by applying a second weight to the weighted average value.

12. The method according to claim 11, wherein the determining the lighting adjustment value by applying of a second weight comprises:
determining an estimated arrival time of the destination, and applying the second weight corresponding to the estimated arrival time.

13. The method according to claim 10, wherein the obtaining a reference characteristic value of the destination comprises:
obtaining, when the destination is an outdoor place, the reference characteristic value in which weather information of the destination is reflected.

14. The method according to claim 10, wherein the determining an image characteristic value comprises:
obtaining a plurality of the images of the destination; and
determining the image characteristic value by averaging respective characteristic values of the plurality of images.

15. The method according to claim 14, wherein the obtaining a plurality of images of the destination comprises:
obtaining a predetermined threshold number or more of the images.

16. The method according to claim 10, wherein the determining the lighting adjustment value comprises:
determining the lighting adjustment value for at least one of brightness of light or color of light emitted by the lighting device.

17. The method according to claim 10, wherein the lighting device includes a plurality of lighting devices, and
wherein the controlling a lighting device comprises:
independently controlling each of the plurality of lighting devices based on the reference characteristic value and the image characteristic value.

18. The method according to claim 10, wherein the obtaining a reference characteristic value of the destination comprises:
obtaining the reference characteristic value of the destination from a storage configured to store reference characteristic values for a plurality of places or from the external server.

* * * * *